United States Patent
Kim et al.

(10) Patent No.: US 12,526,511 B2
(45) Date of Patent: Jan. 13, 2026

(54) METHOD AND APPARATUS FOR CONTROLLING PAN-TILT-ZOOM (PTZ) CAMERA ACCORDING TO SETTING VALUE

(71) Applicant: HANWHA VISION CO., LTD., Seongnam-si (KR)

(72) Inventors: Yeon Woo Kim, Seongnam-si (KR); Sae Rom Won, Seongnam-si (KR)

(73) Assignee: Hanwha Vision Co., Ltd., Seongnam-si (KR)

(*) Notice: Subject to any disclaimer, the term of this patent is extended or adjusted under 35 U.S.C. 154(b) by 100 days.

(21) Appl. No.: 18/638,736

(22) Filed: Apr. 18, 2024

(65) Prior Publication Data

US 2024/0357227 A1 Oct. 24, 2024

(30) Foreign Application Priority Data

Apr. 19, 2023 (KR) .......................... 10-2023-0051548
Apr. 19, 2023 (KR) .......................... 10-2023-0051549

(51) Int. Cl.
*H04N 23/63* (2023.01)
*H04N 23/67* (2023.01)
*H04N 23/69* (2023.01)
*H04N 23/695* (2023.01)

(52) U.S. Cl.
CPC ......... *H04N 23/632* (2023.01); *H04N 23/635* (2023.01); *H04N 23/675* (2023.01); *H04N 23/69* (2023.01); *H04N 23/695* (2023.01)

(58) Field of Classification Search
CPC .. H04N 23/635; H04N 23/631; H04N 23/632; H04N 23/695; H04N 23/62; H04N 23/675; H04N 23/69

USPC ...................................................... 348/333.03
See application file for complete search history.

(56) References Cited

U.S. PATENT DOCUMENTS

| 8,264,545 | B2 * | 9/2012 | Suzuki | H04N 23/61 348/169 |
|---|---|---|---|---|
| 8,363,126 | B2 * | 1/2013 | Kurokawa | H04N 23/62 348/333.12 |
| 9,906,710 | B2 * | 2/2018 | Kim | H04N 23/695 |
| 10,015,404 | B2 * | 7/2018 | Hara | H04N 23/675 |
| 10,397,482 | B2 * | 8/2019 | Takagi | H04N 23/675 |
| 10,447,918 | B2 * | 10/2019 | Kobayashi | H04N 5/2624 |
| 10,462,373 | B2 * | 10/2019 | Ishihara | G06T 3/04 |
| 10,742,888 | B2 * | 8/2020 | Hara | H04N 23/632 |

(Continued)

FOREIGN PATENT DOCUMENTS

| KR | 10-2011-0093040 A | 8/2011 |
|---|---|---|
| KR | 10-1793702 B1 | 3/2017 |
| KR | 10-2022-0135507 A | 3/2022 |

*Primary Examiner* — Pritham D Prabhakher
(74) *Attorney, Agent, or Firm* — McLean IP Global; Jason Y. Pahng

(57) ABSTRACT

Provided is a technique for controlling a pan-tilt-zoom (PTZ) camera. A method of controlling a PTZ camera via a user terminal includes displaying, on a screen, a first image obtained from the PTZ camera according to a first setting value, obtaining a first user input for setting, on the screen, an area corresponding to a second setting value, displaying, on the screen, a second image obtained from the PTZ camera according to the second setting value, obtaining a second user input on the screen, and generating a plurality of areas corresponding to the second user input.

20 Claims, 13 Drawing Sheets

(56) References Cited

U.S. PATENT DOCUMENTS

| | | | |
|---|---|---|---|
| 10,917,571 B2 * | 2/2021 | Shanmugam | H04N 23/62 |
| 11,457,151 B2 * | 9/2022 | An | H04N 5/2628 |
| 11,968,447 B2 * | 4/2024 | Li | H04N 23/632 |
| 2008/0240563 A1 * | 10/2008 | Takano | H04N 23/635 |
| | | | 382/173 |
| 2013/0155308 A1 * | 6/2013 | Wu | H04N 23/611 |
| | | | 348/333.05 |
| 2017/0054913 A1 * | 2/2017 | Hara | H04N 23/635 |
| 2017/0155827 A1 * | 6/2017 | Kim | H04N 23/69 |
| 2017/0272660 A1 * | 9/2017 | Ishihara | G06T 3/04 |
| 2019/0149744 A1 * | 5/2019 | Fukunaga | H04N 23/698 |
| | | | 348/207.1 |
| 2020/0145583 A1 | 5/2020 | Shanmugam et al. | |
| 2020/0260015 A1 * | 8/2020 | An | H04N 23/90 |

* cited by examiner

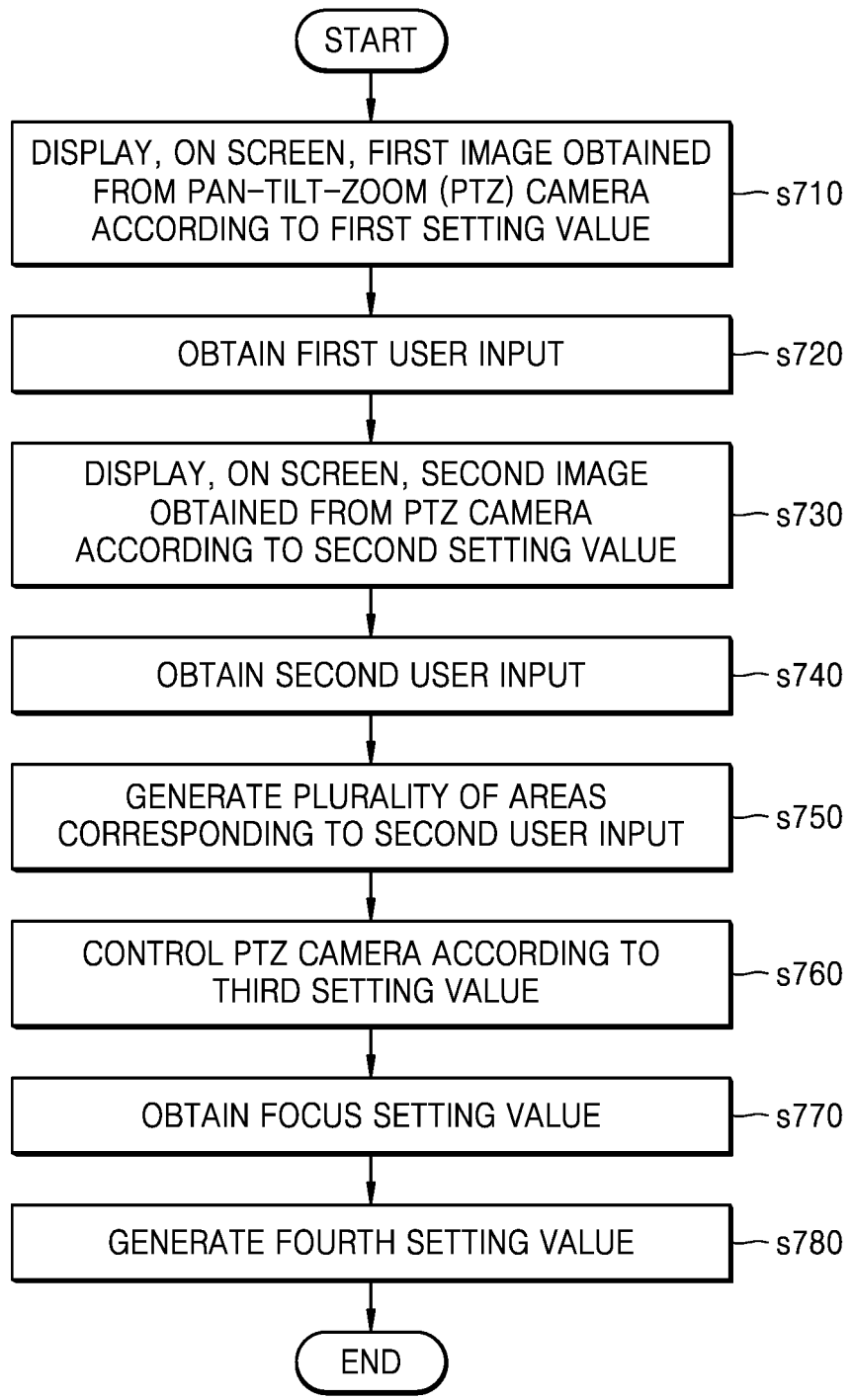

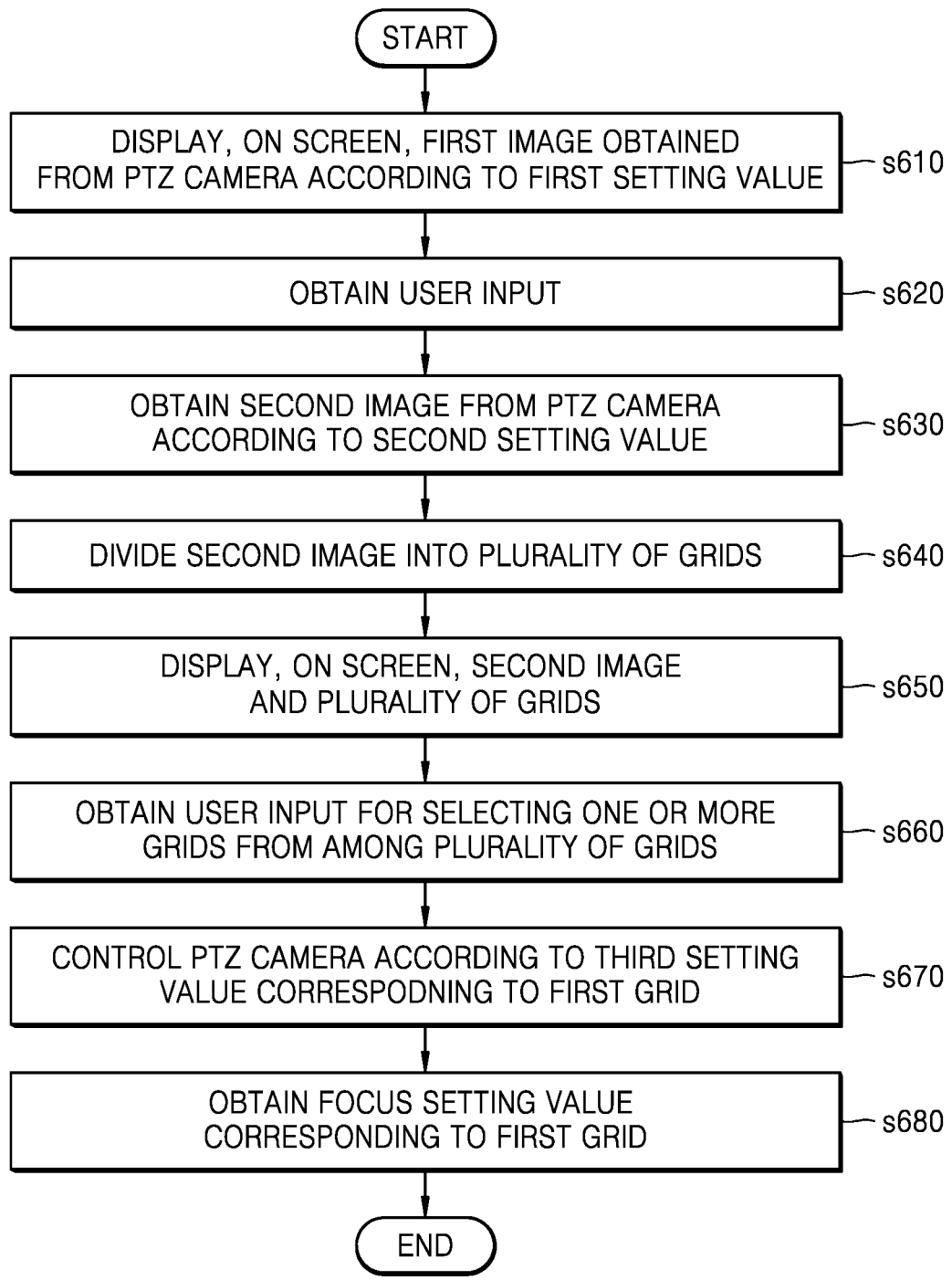

METHOD AND APPARATUS FOR CONTROLLING PAN-TILT-ZOOM (PTZ) CAMERA ACCORDING TO SETTING VALUE

CROSS-REFERENCE TO RELATED APPLICATION

This application is based on and claims priority under 35 U.S.C. § 119 to Korean Patent Application Nos. 10-2023-0051548 and 10-2023-0051549, both filed on Apr. 19, 2023, in the Korean Intellectual Property Office, the disclosures of which are incorporated by reference herein in their entireties.

BACKGROUND

1. Field

The disclosure relates to a technique for controlling a pan-tilt-zoom (PTZ) camera.

2. Description of the Related Art

A pan-tilt-zoom (PTZ) camera is a camera that is able to remotely control a direction and zoom in/out. In the case of a PTZ camera, based on its characteristics, an image may be obtained according to pan, tilt, and zoom settings, and in this process, a time delay occurs until an image is captured.

The background art described above corresponds to technical information contained by the inventor to derive the disclosure or acquired in the process of deriving the disclosure and may not necessarily correspond to the well-known art publicly known before the application of the disclosure.

SUMMARY

Provided is a method and apparatus for effectively controlling a pan-tilt-zoom (PTZ) camera.

Additional aspects will be set forth in part in the description which follows and, in part, will be apparent from the description, or may be learned by practice of the present disclosure.

According to an aspect of the disclosure, a method of controlling a pan-tilt-zoom (PTZ) camera via a user terminal includes displaying, on a screen, a first image obtained from the PTZ camera according to a first setting value, obtaining a first user input for setting, on the screen, an area corresponding to a second setting value, displaying, on the screen, a second image obtained from the PTZ camera according to the second setting value, obtaining a second user input on the screen, and generating a plurality of areas corresponding to the second user input.

The second user input may be to set a free curve on the screen.

The generating of the plurality of areas may include generating the plurality of areas including a plurality of points included in the free curve.

The method may further include controlling the PTZ camera according to each one of a third setting value corresponding to each one of the plurality of areas and obtaining a focus setting value corresponding to each of the plurality of areas from the PTZ camera.

The method may further include generating each one of a fourth setting value corresponding to each one of the plurality of areas based on the focus setting value and controlling the PTZ camera according to each one of the fourth setting value corresponding to each one of the plurality of areas.

According to another aspect of the disclosure, a user terminal is configured to control a pan-tilt-zoom (PTZ) camera and includes a controller, wherein the controller is configured to display, on a screen, a first image obtained from the PTZ camera according to a first setting value, obtain a first user input for setting, on the screen, an area corresponding to a second setting value, display, on the screen, a second image obtained from the PTZ camera according to the second setting value, obtain a second user input on the screen, and generate a plurality of areas corresponding to the second user input. The second user input may be to set a free curve on the screen.

The controller may further be configured to generate a plurality of areas including, near the center thereof, a plurality of points included in the free curve.

The controller may further be configured to control the PTZ camera according to each one of a third setting value corresponding to each one of the plurality of areas and obtain a focus setting value corresponding to each of the plurality of areas from the PTZ camera.

The controller may further be configured to generate each one of a fourth setting value corresponding to each one of the plurality of areas based on the focus setting value and control the PTZ camera according to each one of the fourth setting value corresponding to each one of the plurality of areas.

According to another aspect of the disclosure, a method of controlling a pan-tilt-zoom (PTZ) camera via a user terminal includes displaying, on a screen, a first image obtained from the PTZ camera according to a first setting value, obtaining a user input for setting, on the screen, an area corresponding to a second setting value, obtaining a second image from the PTZ camera according to the second setting value, dividing the second image into a plurality of grids based on performance of the PTZ camera, displaying, on the screen, the second image and the plurality of grids, and obtaining a user input for selecting one or more grids from among the plurality of grids on the screen.

The method may further include, with respect to a first grid from among the selected one or more grids, controlling the PTZ camera according to a third setting value corresponding to the first grid, and obtaining a focus setting value corresponding to the first grid from the PTZ camera.

The method may further include generating a fourth setting value corresponding to the first grid based on the focus setting value and controlling the PTZ camera according to the fourth setting value corresponding to the first gird.

The dividing of the second image into the plurality of grids may include dividing the second image into the plurality of grids based on zoom performance of the PTZ camera and a zoom ratio of the second image.

The user input for selecting the one or more grids may include at least one of a touch operation, a tap operation, a drag operation, and a click operation.

According to another aspect of the disclosure, a user terminal is configured to control a pan-tilt-zoom (PTZ) camera and includes a controller, wherein the controller is configured to display, on a screen, a first image obtained from the PTZ camera according to a first setting value, obtain a user input for setting, on the screen, an area corresponding to a second setting value, obtain a second image from the PTZ camera according to the second setting value, divide the second image into a plurality of grids based on performance of the PTZ camera, display, on the screen, the second image and the plurality of grids, and obtain a user input for selecting one or more grids from among the plurality of grids on the screen.

The controller may further be configured to, with respect to a first grid from among the selected one or more grids, control the PTZ camera according to a third setting value corresponding to the first grid, and obtain a focus setting value corresponding to the first grid from the PTZ camera.

The controller may further be configured to generate a fourth setting value corresponding to the first grid based on the focus setting value and control the PTZ camera according to the fourth setting value corresponding to the first gird.

The controller may further be configured to divide the second image into the plurality of grids based on zoom performance of the PTZ camera and a zoom ratio of the second image.

The user input may include at least one of a touch operation, a tap operation, a drag operation, and a click operation.

BRIEF DESCRIPTION OF THE DRAWINGS

The above and other aspects, features, and advantages of the disclosure will be more apparent from the following description taken in conjunction with the accompanying drawings, in which:

FIG. 1G is a flowchart of an operation of a user terminal according to the present disclosure;

FIG. 2F is a flowchart of an operation of a user terminal according to the present disclosure.

DETAILED DESCRIPTION

Figure 1A:
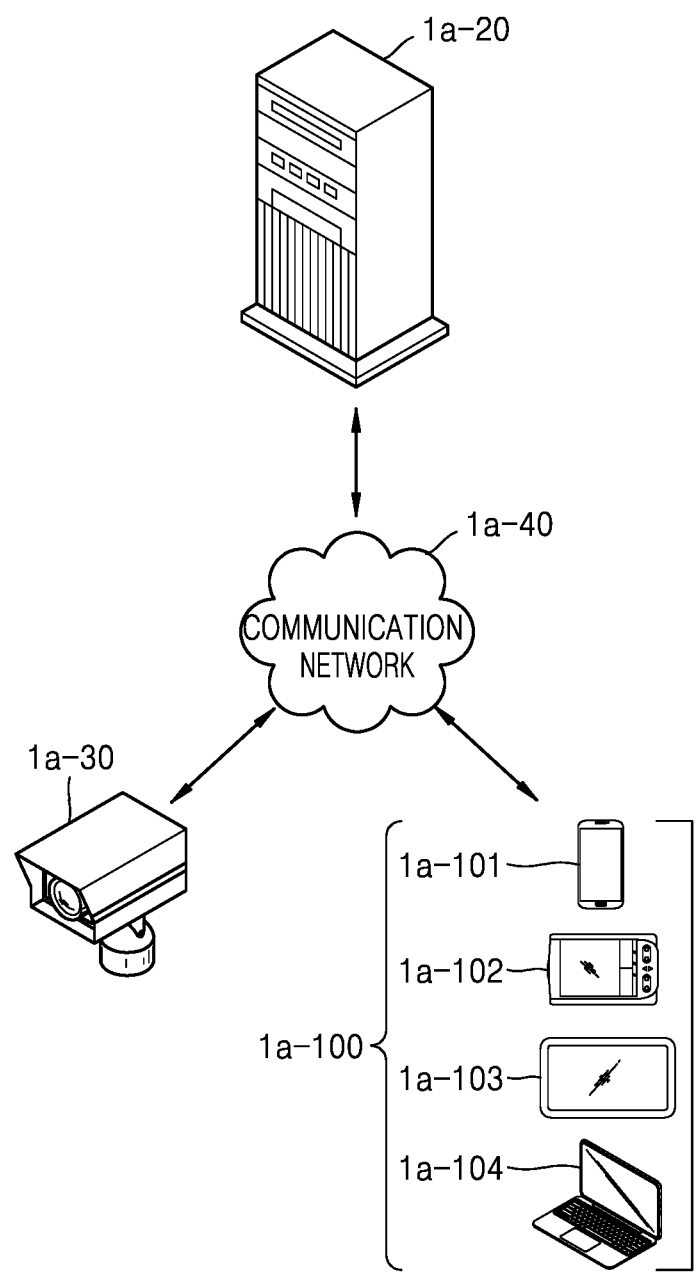
FIG. 1A schematically illustrates an image system according to the present disclosure.

Reference will now be made in detail, examples of which are illustrated in the accompanying drawings, wherein like reference numerals refer to like elements throughout. In this regard, the present disclosure may have different forms and should not be construed as being limited to the descriptions set forth herein. Accordingly, the present disclosure is merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Various modifications may be made to the disclosure, and the disclosure may have various examples, and thus, one or more examples are shown in the drawings and will herein be described in detail. The effects and the characteristics of the disclosure, and methods of realizing the same will become apparent by referring to the drawings and examples described in detail below. However, the disclosure is not limited to the examples disclosed below and may be realized in various forms.

Hereinafter, the present disclosure will be described in detail by referring to the accompanying drawings. In descriptions with reference to the drawings, the same reference numerals are given to elements that are the same or substantially the same and descriptions will not be repeated.

It will be understood that although the terms "first," "second," etc. may be used herein to describe various components, these components should not be limited by these terms. These components are only used to distinguish one component from another. As used herein, the singular expressions "a," "an," and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of elements in the drawings may be exaggerated for convenience of explanation. For example, sizes and shapes of the elements in the drawings are randomly indicated for convenience of explanation, and thus, the disclosure is not necessarily limited to the illustrations of the drawings.

FIG. 1A schematically illustrates an image system according to the present disclosure.

The image system according to the present disclosure may control a pan-tilt-zoom (PTZ) camera, based on selecting an area in an image. For example, the image system according to the present disclosure may control the PTZ camera to obtain an image according to a second PTZ setting value corresponding to the user input of selecting an area in a first image (an image obtained by the PTZ camera according to a first PTZ setting value).

As described above, according to the disclosure, the PTZ camera may be controlled based on a user input for intuitively selecting a region of interest of the user in an image.

The image system according to the present disclosure may include a user terminal 1a-100, an image storage device 1a-20, a PTZ camera 1a-30, and a communication network 1a-40, as illustrated in FIG. 1A.

The user terminal 1a-100 according to the present disclosure may indicate various types of computing devices configured to display an image obtained by the PTZ camera 1a-30 and obtain a user input with respect to the image to generate a control signal for controlling the PTZ camera 1a-30. The user terminal 1a-100 is not limited thereto and may correspond to all devices configured to control the PTZ camera 1a-30. For example, the user terminal 1a-100 may indicate portable terminals 1a-101, 1a-102, and 1a-103 or may indicate a computer 1a-104, as illustrated in FIG. 1A. Alternatively, the user terminal 100 may be a PTZ remote control device. However, the user terminal 1a-100 in the form illustrated in FIG. 1A is only an example, and the concept of the disclosure is not limited thereto. The structure of the user terminal 1*a*-100 will be described with reference to FIG. 1B.

The image storage device 1*a*-20 according to the present disclosure may refer to a device configured to receive, from the PTZ camera 1*a*-30, an image obtained by the PTZ camera 1*a*-30 and store the image and provide the stored image to another device (for example, the user terminal 1*a*-100). For example, according to the present disclosure, the image storage device 1*a*-20 may provide the image obtained by the PTZ camera 1*a*-30 to the user terminal 1*a*-100 and may receive a control command of the PTZ camera 1*a*-30 from the user terminal 1*a*-100 and provide the control command to the PTZ camera 1*a*-30. However, this configuration is only an example, and the concept of the disclosure is not limited thereto.

According to the present disclosure, the image storage device 1*a*-20 may be any one of a video management system (VMS), a central management system (CMS), a network video recorder (NVR), and a digital video recorder (DVR), or a component thereof.

The PTZ camera 1*a*-30 according to the present disclosure may be configured to obtain an image according to a set PTZ value. Here, the PTZ value may include any one of a pan value, a tilt value, and a zoom value.

According to a selective embodiment, the PTZ value may not include any one of the pan value, the tilt value, and the zoom value. For example, the PTZ value may include only the pan value and the tilt value or may include only the tilt value and the zoom value. However, this configuration is only an example, and the concept of the disclosure is not limited thereto.

The communication network 1*a*-40 according to the present disclosure may function as a path for transmitting and receiving data to and from the components of the system. For example, the communication network 1*a*-40 may function as a path for providing an image obtained by the PTZ camera 1*a*-30 to the user terminal 1*a*-100. Also, the communication network 1*a*-40 may function as a path for providing a PTZ control command generated by the user terminal 1*a*-100 to the PTZ camera 1*a*-30.

Here, the communication network 1*a*-40 may encompass wired networks, such as a local area network (LAN), a wide area network (WAN), a metropolitan area network (MAN), an integrated service digital network (ISDN), etc., or wireless networks, such as a wireless LAN, code-division multiple access (CDMA), Bluetooth, satellite communication, etc., but the scope of the disclosure is not limited thereto.

Figure 1B:
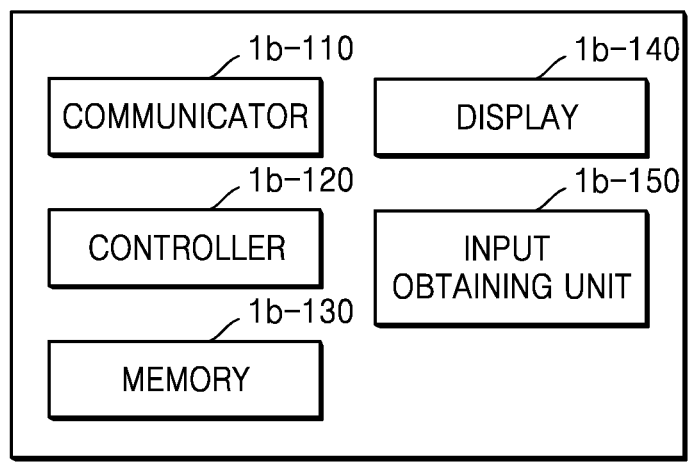
FIG. 1B schematically illustrates a structure of a user terminal according to the present disclosure.

FIG. 1B schematically illustrates a structure of the user terminal 1*a*-100 according to the present disclosure.

Referring to FIG. 1B, the user terminal 1*a*-100 according to the present disclosure may include a communicator 1*b*-110, a controller 1*b*-120, a memory 1*b*-130, a display 1*b*-140, and an input obtaining unit 1*b*-150.

The communicator 1*b*-110 according to the present disclosure may indicate a device including hardware and software necessary to transmit and receive, to and from another network device, a signal, such as a control signal or a data signal, through wired or wireless connection.

The controller 1*b*-120 according to the present disclosure may generate a control command of the PTZ camera 1*a*-30, based on selection of an area in a displayed image. Here, the controller 1*b*-120 may include all types of devices capable of processing data, such as a processor. Here, the processor may indicate, for example, a data processing device embedded in hardware and having a circuit physically structuralized to perform a function represented as a code or a command included in a program. Examples of the data processing device embedded in hardware as described above may include all types of processing devices encompassing a microprocessor, a central processing unit (CPU), a processor core, a multiprocessor, an application-specific integrated circuit (ASIC), a field programmable gate array (FPGA), etc., but the scope of the disclosure is not limited thereto. The controller 1*b*-120 as described above may be formed as a single processor or may be formed as a plurality of processors divided into units of functions that are performed by the controller 1*b*-120.

The memory 1*b*-130 according to the present disclosure may temporarily or permanently store data, instructions, programs, or program codes, which are processed by the controller 1*b*-120, or a combination thereof. The memory 1*b*-130 as described above may include magnetic storage media or flash storage media, but the scope of the disclosure is not limited thereto. The memory 1*b*-130 according to the present disclosure may store a setting value of the PTZ camera 1*a*-30, the setting value being configured for the PTZ camera 1*a*-30 to have an angle of view of a predetermined area. For example, the memory 1*b*-130 may store at least one of a pan value, a tilt value, a zoom value, and a focus setting value.

The display 1*b*-140 according to the present disclosure may indicate a display device configured to display a figure, a letter, or a combination thereof according to an electrical signal generated by the controller 1*b*-120. For example, the display 1*b*-140 may include any one of a cathode ray tube (CRT), a liquid crystal display (LCD), a plasma display panel (PDP), and an organic light-emitting diode (OLED), but the concept of the disclosure is not limited thereto.

The input obtaining unit 1*b*-150 according to the present disclosure may obtain a user input of selecting an area in an image displayed on the display 1*b*-140. Here, the input obtaining unit 1*b*-150 may include, for example, devices, such as a keyboard, a mouse, and a touch panel. However, this configuration is only an example, and the concept of the disclosure is not limited thereto.

Hereinafter, a process in which the controller 1*b*-120 generates a control command for controlling the PTZ camera 1*a*-30 will be mainly described.

The controller 1*b*-120 according to the present disclosure may display, on a screen of the display 1*b*-140, a first image obtained from the PTZ camera 1*a*-30 according to a first setting value, obtain, from the input obtaining unit 1*b*-150, a first user input for setting, on the screen, an area corresponding to a second setting value, display, on the screen of the display 1*b*-140, a second image obtained from the PTZ camera 1*a*-30 according to the second setting value, obtain, from the input obtaining unit 1*b*-150, a second user input on the screen, and generate a plurality of areas corresponding to the second user input. The second user input may correspond to a user input for setting a free curve on the screen, and the controller 1*b*-120 may generate a plurality of areas having, near the center thereof, a plurality of points forming the free curve.

The controller 1*b*-120 according to the present disclosure may generate a plurality of areas including, near the center thereof, a plurality of points, according to a user input for setting the plurality of points on the screen.

The controller 1*b*-120 according to the present disclosure may control the PTZ camera 1*a*-30 according to each one of a third setting value corresponding to each one of the plurality of areas and may obtain, from the PTZ camera 1*a*-30, a focus setting value corresponding to each of the plurality of areas.

The controller 1b-120 according to the present disclosure may generate each one of a fourth setting value corresponding to each one of the plurality of areas, based on the focus setting value, and may control the PTZ camera 1a-30 according to each one of the fourth setting value corresponding to each one of the plurality of areas.

Figure 1C:
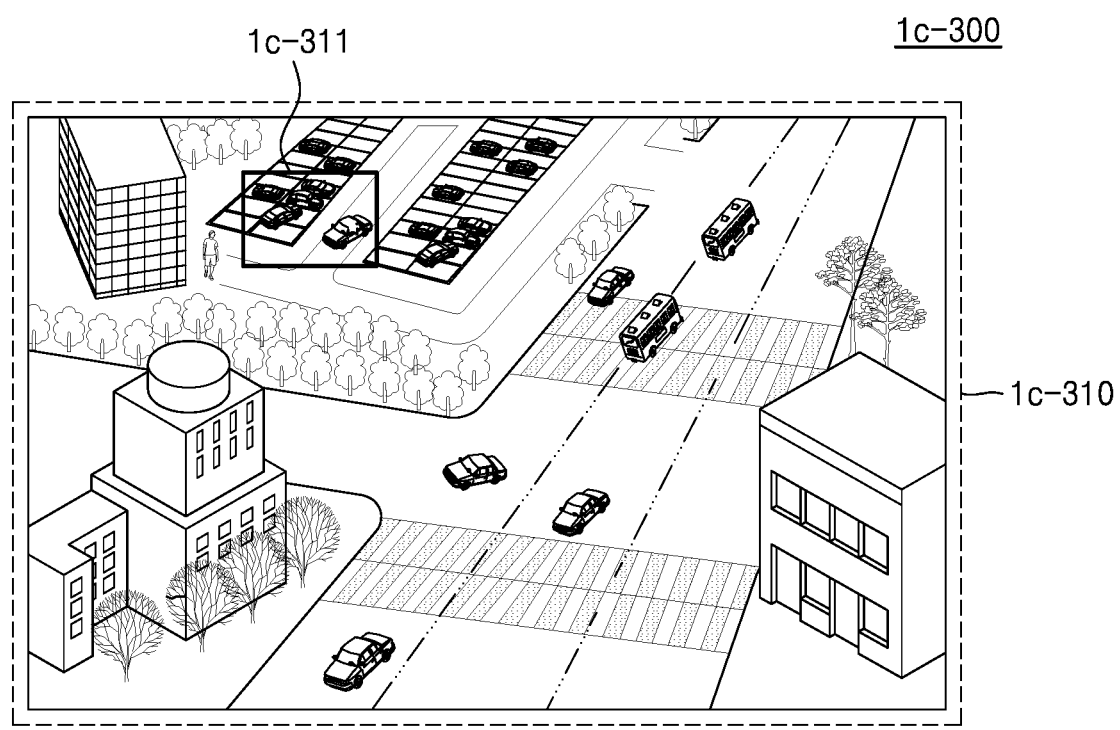
FIG. 1C illustrates an example of a screen of a user terminal, on which a first image is displayed.

FIG. 1C illustrates an example of a screen 1c-300 of the user terminal 100, on which a first image is displayed.

Referring to FIG. 1C, the screen 1c-300 may include an image display area 1c-310. The image display area 1c-310 may display an image obtained by the PTZ camera 1a-30, such as the first image. The first image may be an image in a maximum zoom-out state of the PTZ camera 1a-30.

The user terminal 1a-100 according to the present disclosure may display the first image on the image display area 1c-310.

The user terminal 1a-100 may obtain a first user input for setting an area 1c-311 in the first image displayed on the screen 1c-300. The area 1c-311 may correspond to the second PTZ setting value. The PTZ camera 1a-30 may obtain an image of an angle of view corresponding to a corresponding area, in the corresponding PTZ setting value.

For example, the user terminal 1a-100 according to the present disclosure may obtain a user input for setting an area in the form of a quadrangle having a certain ratio between a horizontal length and a vertical length in the first image displayed on the screen and may control the PTZ camera 1a-30 to have an angle of view of the corresponding area to obtain the second image.

The user terminal 1a-100 according to the present disclosure may transmit a control command for controlling the PTZ camera 1a-30 according to the second PTZ setting value to the PTZ camera 1a-30. The PTZ camera 1a-30 may capture the second image according to the second setting value. The setting value may include not only a pan value, a tilt value, and a zoom value, but also a focus setting value.

The PTZ camera 1a-30 may be controlled to have the angle of view of the corresponding area through the pan value, the tilt value, and the zoom value and obtain an image, in the process of capturing the image according to the setting value. When the setting value of the PTZ camera 1a-30 includes the focus setting value, the PTZ camera 1a-30 may set a focus with reference to the focus setting value. Also, when the setting value of the PTZ camera 1a-30 does not include the focus setting value, the focus may be automatically set, and the focus setting value may be stored or transmitted to the user terminal 1a-100.

Figure 1D:
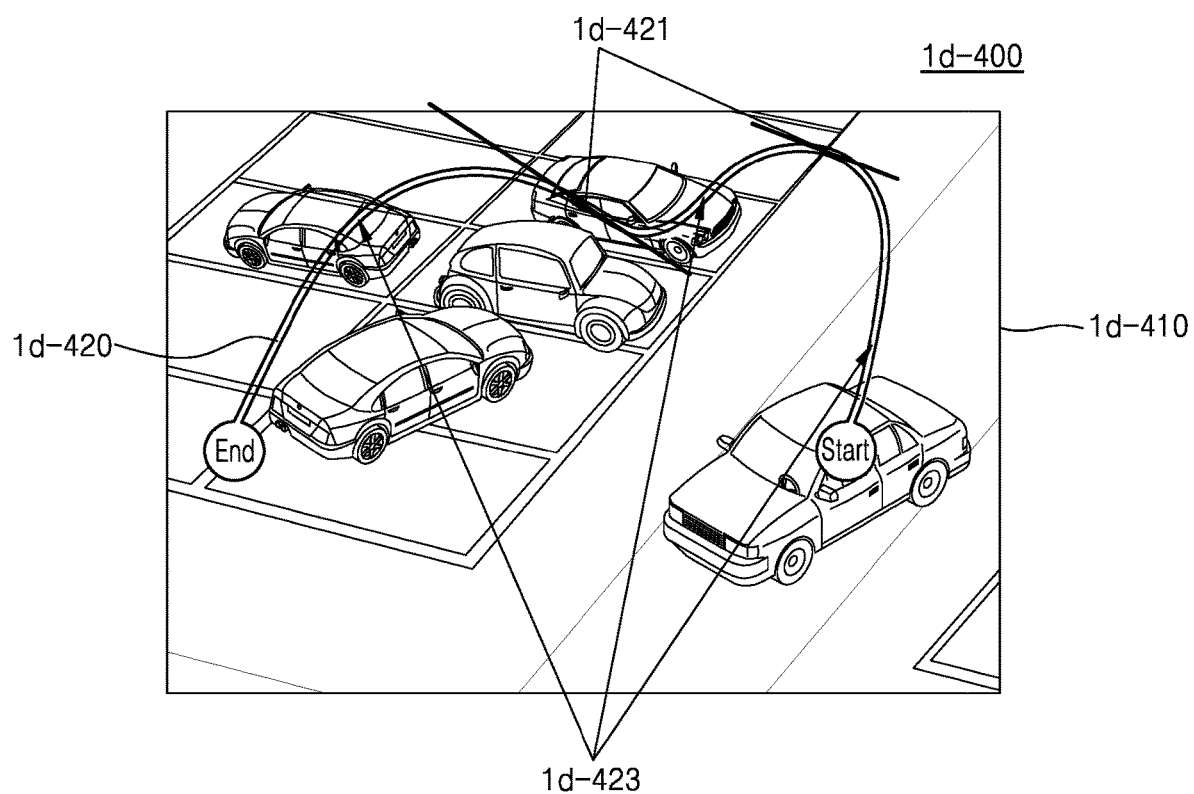
FIG. 1D illustrates an example of a screen of a user terminal, on which a second image and a user input are displayed.

FIG. 1D illustrates an example of a screen 1d-400 of the user terminal 100, on which the second image and a second user input 1d-420 are displayed.

Referring to FIG. 1D, the screen 1d-400 may include an image display area 1d-410. The user terminal 1a-100 may obtain the second user input 1d-420 in the second image displayed on the screen 1d-400. The second user input may be an input for setting a section which is to be precisely photographed by the PTZ camera 1a-30. The second user input 1d-420 according to the present disclosure may be a user input for setting a free curve on the screen 1d-400. The PTZ camera 1a-30 may be controlled according to the second user input 1d-420 to capture an image corresponding to the second user input 1d-420.

Figure 1E:
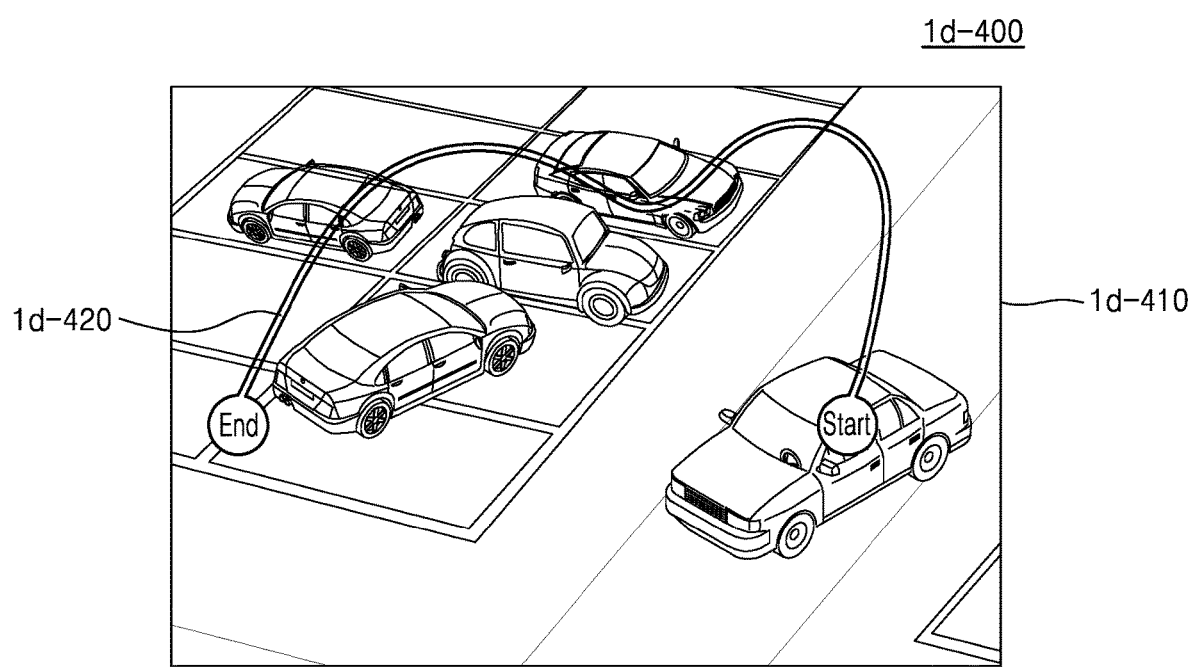
FIG. 1E is a view for describing a process of correcting a user input.

FIG. 1E is a view for describing a process in which a user input is corrected when the user input 1d-420 is a free curve. The free curve may include a segment 1d-423 and a plurality of control points 1d-421. The segment 1d-423 may indicate a curve connecting two adjacent control points 1d-421.

The user terminal 1a-100 may obtain a user input for correcting the control points from the plurality of displayed control points. The user terminal 1a-100 may correct the free curve by identifying positions of the corrected control points 1d-421 based on the user unit and generating the segment 1d-423 again.

Figure 1F:
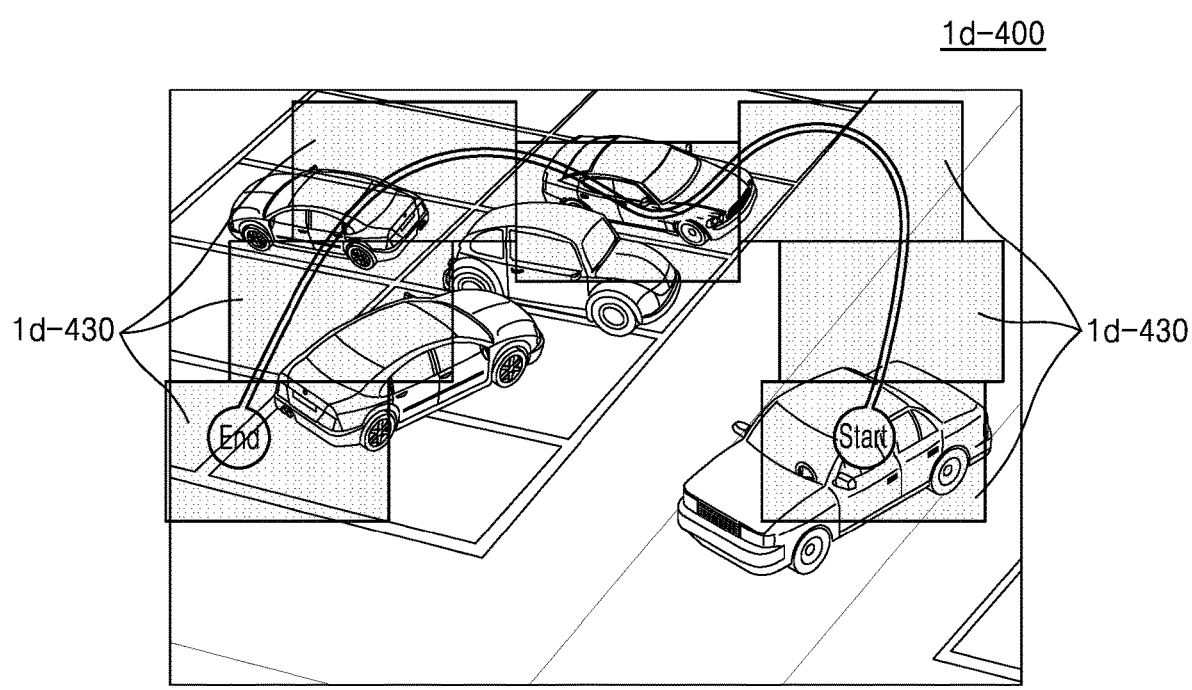
FIG. 1F illustrates an example of a screen on which a plurality of areas corresponding to a user input are displayed.

FIG. 1F illustrates an example of a screen on which a plurality of areas 1d-430 corresponding to a user input are displayed. Referring to FIG. 1F, the user terminal 1a-100 may generate a plurality of areas 1d-430 for controlling the PTZ camera 1a-30, based on the user input. The user terminal 1a-100 according to the present disclosure may generate the plurality of areas 1d-430 by dividing a free curve, when the user input is the free curve. For example, the user terminal 1a-100 may generate the plurality of areas 1d-430 having, near the center thereof, a plurality of points included in the free curve.

The user terminal 1a-100 according to the present disclosure may generate the plurality of areas 1d-430 in various ways, based on the zoom performance of the PTZ camera 1a-30 and a zoom ratio of the second image.

For example, when an area indicated by each of the plurality of areas 1d-430 has an angle of view based on the maximum zoon performance of the PTZ camera 1a-30, the user terminal 1a-100 may generate the plurality of areas 1d-430 for the PTZ camera 1a-30 to obtain an image according to the free curve.

The user terminal 1a-100 may control the PTZ camera 1a-30 to have an angle of view of an area corresponding to each of the plurality of areas. The user terminal 1a-100 according to the present disclosure may transmit a control command for controlling the PTZ camera 1a-30 according to a third PTZ setting value to the PTZ camera 1a-30. The setting value may include not only a pan value, a tilt value, and a zoom value, but also a focus setting value.

The PTZ camera 1a-30 may be controlled to have the angle of view of the corresponding area through the pan value, the tilt value, and the zoom value and obtain an image in the process of capturing the image according to the setting value. When the setting value of the PTZ camera 1a-30 includes the focus setting value, the PTZ camera 1a-30 may set the focus with reference to the focus setting value. Also, when the setting value of the PTZ camera 1a-30 does not include the focus setting value, the focus may be automatically set, and the focus setting value may be stored or transmitted to the user terminal 1a-100.

The user terminal 1a-100 may control the PTZ camera 1a-30 to have an angel of view of an area corresponding to each of the plurality of areas and may receive the focus setting value to generate each one of a fourth setting value corresponding to each one of the plurality of areas. For example, the fourth setting value may include a pan value, a tilt value, a zoom value, and the focus setting value of the PTZ camera 1a-30. The user terminal 1a-100 may store the fourth setting value.

Thereafter, when the user terminal 1a-100 controls the PTZ camera 1a-30 to have the angle of view of the area corresponding to each of the plurality of areas, the user terminal 1a-100 may control the PTZ camera 1a-30 according to the fourth setting value. The PTZ camera 1a-30 may set a focus based on the focus setting value included in the fourth setting value.

Through the series of processes described above, the PTZ camera 1a-30 may relatively rapidly set the focus, when the PTZ camera 1a-30 is controlled to have an angle of view of selected at least one grid area.

FIG. 1G is a flowchart of an operation of the user terminal 1a-100 according to the present disclosure.

Referring to FIG. 1G, the user terminal 1a-100 may display, on a screen, a first image obtained from the PTZ camera 1a-30 according to a first setting value, in operation S710. The first image may be an image in a maximum zoom-out state of the PTZ camera 1a-30. The setting value may include not only a pan value, a tilt value, and a zoom value, but also a focus setting value.

The user terminal 1a-100 according to the present disclosure may obtain a first user input for setting, on a screen, an area corresponding to a second setting value, in operation S720. The user terminal 1a-100 may obtain the user input for setting an area in the form of a quadrangle having a certain ratio between a horizontal length and a vertical length in the first image displayed on the screen.

The user terminal 1a-100 according to the present disclosure may transmit a control command for controlling the PTZ camera 1a-30 according to the second setting value to the PTZ camera 1a-30 in operation S730, and the PTZ camera 1a-30 may capture a second image according to the second setting value and transmit the second image to the user terminal 1a-100. The user terminal 1a-100 may obtain the second image from the PTZ camera 1a-30 according to the second setting value. The user terminal 1a-100 may display, on the screen, the second image obtained from the PTZ camera 1a-30 according to the second setting value.

The user terminal 1a-100 according to the present disclosure may obtain a second user input in operation S740. The second user input may be an input for setting a section which is to be precisely photographed by the PTZ camera 1a-30. The second user input according to the present disclosure may be a user input for setting a free curve on the screen. The PTZ camera 1a-30 may be controlled according to the second user input to capture an image corresponding to the second user input.

The user terminal 1a-100 according to the present disclosure may generate a plurality of areas corresponding to the second user input in operation S750. For example, the user terminal 1a-100 may generate a plurality of areas having, near the center thereof, a plurality of points included in the free curve.

The user terminal 1a-100 according to the present disclosure may transmit a control command for controlling the PTZ camera 1a-30 according to a third setting value to the PTZ camera 1a-30, in order to capture an image having an angle of view corresponding to each of the plurality of areas, in operation S760.

The user terminal 1a-100 according to the present disclosure may transmit a control command for controlling the PTZ camera 1a-30 according to the third setting value to the PTZ camera 1a-30, in order to capture an image having an angle of view corresponding to each of the plurality of areas, in operation S770. The PTZ camera 1a-30 may control the PTZ camera 1a-30 according to the third setting value and may automatically set the focus. The PTZ camera 1a-30 may store a focus setting value or transmit the focus setting value to the user terminal 1a-100.

The user terminal 1a-100 according to the present disclosure may obtain the focus setting value corresponding to each of the plurality of areas from the PTZ camera 1a-30 and may generate each one of a fourth setting value corresponding to each one of the plurality of areas, in operation S780. For example, the fourth setting value may include a pan value, a tilt value, a zoom value, and the focus setting value of the PTZ camera 1a-30 for having the angle of view of the area corresponding to each of the plurality of areas. The user terminal 1a-100 may store the fourth setting value.

Thereafter, the user terminal 1a-100 may control the PTZ camera 1a-30 according to the fourth setting value, when the user terminal controls the PTZ camera 1a-30 to have the angle of view of the area corresponding to each of the plurality of areas. The PTZ camera 1a-30 may set the focus based on the focus setting value included in the fourth setting value.

According to the present disclosure as described above, the user terminal 1a-100 may store the setting value in grid units selected by the user and may use the setting value when the user terminal 1a-100 controls the PTZ camera 1a-30. Thus, the user terminal 1a-100 may relatively more effectively provide an obtained image during the process of controlling the PTZ camera 1a-30.

Figure 2A:
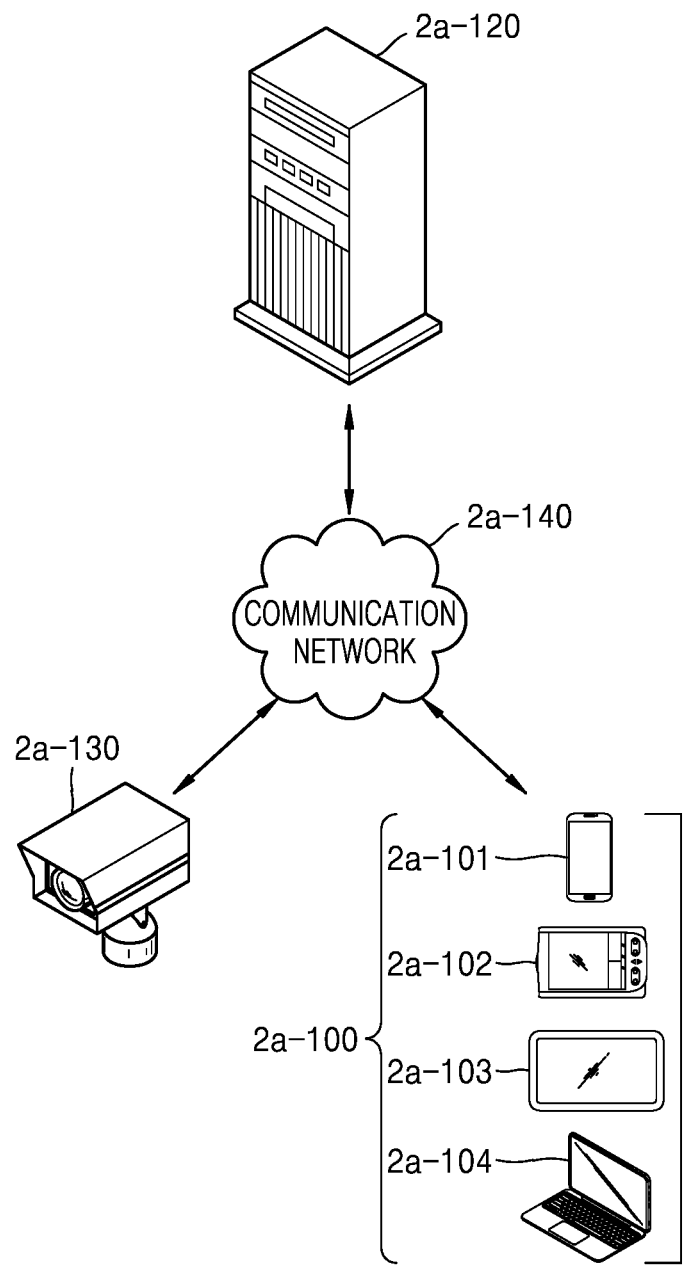
FIG. 2A schematically illustrates an image system according to the present disclosure.

FIG. 2A schematically illustrates an image system according to the present disclosure.

The image system according to the present disclosure may control a PTZ camera, based on an selecting an area in an image. For example, the image system according to the present disclosure may control the PTZ camera to obtain an image according to a second PTZ setting value corresponding to a selected area, based on a user input for selecting the area in a first image (an image obtained by the PTZ camera according to a first PTZ setting value).

As described above, according to the disclosure, the PTZ camera may be controlled based on a user input for intuitively selecting a region of interest of the user.

The image system according to the present disclosure may include a user terminal 2a-100, an image storage device 2a-20, a PTZ camera 2a-30, and a communication network 2a-40, as illustrated in FIG. 2A.

The user terminal 2a-100 according to the present disclosure may indicate various types of computing devices configured to display an image obtained by the PTZ camera 2a-30 and obtain a user input with respect to the image to generate a control signal for controlling the PTZ camera 2a-30. The user terminal 2a-100 is not limited thereto and may correspond to all devices configured to control the PTZ camera 2a-30. For example, the user terminal 2a-100 may indicate portable terminals 2a-101, 2a-102, and 2a-103 or may indicate a computer 2a-104, as illustrated in FIG. 2A. Alternatively, the user terminal 2a-100 may be a PTZ remote control device. However, the user terminal 2a-100 in the form illustrated in FIG. 2A is only an example, and the concept of the disclosure is not limited thereto. The structure of the user terminal 2a-100 will be described with reference to FIG. 2B.

The image storage device 2a-20 according to the present disclosure may refer to a device configured to receive, from the PTZ camera 2a-30, an image obtained by the PTZ camera 2a-30 and store the image, and provide the stored image to another device (for example, the user terminal 2a-100). For example, according to the present disclosure, the image storage device 2a-20 may provide the image obtained by the PTZ camera 2a-30 to the user terminal 2a-100, and the image storage device 2a-20 may receive a control command of the PTZ camera 2a-30 from the user terminal 2a-100 and provide the control command to the PTZ camera 2a-30. However, this configuration is only an example, and the concept of the disclosure is not limited thereto.

According to the present disclosure, the image storage device 2a-20 may include any one, or a device included in any one of a VMS, a CMS, an NVR, and a DVR.

The PTZ camera 2a-30 according to the present disclosure may be configured to obtain an image according to a set PTZ value. Here, the PTZ value may include any one of a pan value, a tilt value, and a zoom value.

According to a selective embodiment, the PTZ value may not include any one of the pan value, the tilt value, and the zoom value. For example, the PTZ value may include only the pan value and the tilt value or may include only the tilt value and the zoom value. However, this configuration is only an example, and the concept of the disclosure is not limited thereto.

The communication network 2a-40 according to the present disclosure may function as a path for transmitting and receiving data to and from the components of the system. For example, the communication network 2a-40 may function as a path for providing the image obtained by the PTZ camera 2a-30 to the user terminal 2a-100. Also, the communication network 2a-40 may function as a path for providing the PTZ control command generated by the user terminal 2a-100 to the PTZ camera 2a-30.

Here, the communication network 2a-40 may encompass wired networks, such as a LAN, a WAN, a MAN, an ISDN, etc., or wireless networks, such as a wireless LAN, CDMA, Bluetooth, satellite communication, etc., but the scope of the disclosure is not limited thereto.

Figure 2B:
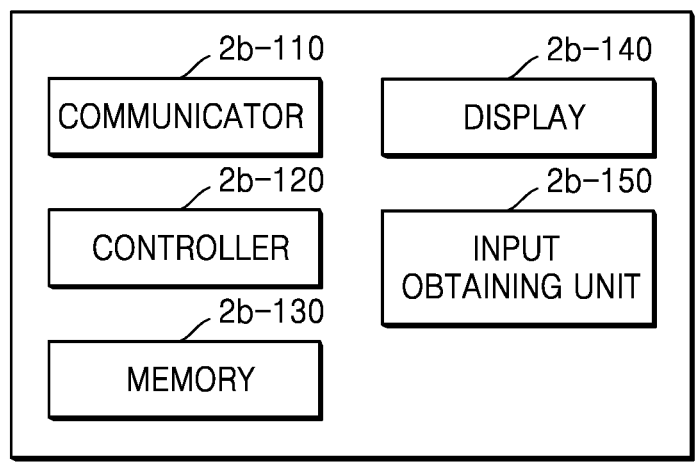
FIG. 2B schematically illustrates a structure of a user terminal according to the present disclosure.

FIG. 2B schematically illustrates a structure of the user terminal 2a-100 according to the present disclosure.

Referring to FIG. 2B, the user terminal 2a-100 according to the present disclosure may include a communicator 2b-110, a controller 2b-120, a memory 2b-130, a display 2b-140, and an input obtaining unit 2b-150.

The communicator 2b-110 according to the present disclosure may indicate a device including hardware and software necessary to transmit and receive, to and from another network device, a signal, such as a control signal or a data signal, through wired or wireless connection.

The controller 2b-120 according to the present disclosure may generate a control command of the PTZ camera 30, based on selecting an area in a displayed image. Here, the controller 2b-120 may include all types of devices capable of processing data, such as a processor. Here, the processor may indicate, for example, a data processing device embedded in hardware and having a circuit physically structuralized to perform a function represented as a code or a command included in a program. Examples of the data processing device embedded in hardware as described above may include all types of processing devices encompassing a microprocessor, a CPU, a processor core, a multiprocessor, an ASIC, an FPGA, etc., but the scope of the disclosure is not limited thereto. The controller 2b-120 as described above may be formed as a single processor or may be formed as a plurality of processors divided into units of functions that are performed by the controller 2b-120.

The memory 2b-130 according to the present disclosure may temporarily or permanently store data, instructions, programs, or program codes, which are processed by the controller 2b-120, or a combination thereof. The memory 2b-130 as described above may include magnetic storage media or flash storage media, but the scope of the disclosure is not limited thereto. The memory 2b-130 according to the present disclosure may store a setting value of the PTZ camera 2b-30 for the PTZ camera 2b-30 to have an angle of view of a predetermined area. For example, the memory 2b-130 may store at least one of a pan value, a tilt value, a zoom value, and a focus setting value.

The display 2b-140 according to the present disclosure may indicate a display device configured to display a figure, a letter, or a combination thereof according to an electrical signal generated by the controller 2b-120. For example, the display 2b-140 may include any one of a CRT, an LCD, a PDP, and an OLED, but the concept of the disclosure is not limited thereto.

The input obtaining unit 2b-150 according to the present disclosure may obtain a user input for setting an area with respect to an image displayed on the display 2b-140. Here, the input obtaining unit 2b-150 may include, for example, devices, such as a keyboard, a mouse, and a touch panel. However, this configuration is only an example, and the concept of the disclosure is not limited thereto.

Hereinafter, a process in which the controller 2b-120 generates a control command for controlling the PTZ camera 2b-30 will be mainly described.

The controller 2b-120 according to the present disclosure may display, on a screen of the display 2b-140, a first image obtained from the PTZ camera 1a-30 according to a first setting value, obtain, from the input obtaining unit 2b-150, a user input for setting, on the screen of the display 2b-140, an area corresponding to a second setting value, obtain a second image from the PTZ camera 2a-30 according to the second setting value, divide the second image into a plurality of grids based on the performance of the PTZ camera 2a-30, display the second image and the plurality of grids on the screen of the display 2b-140, and obtain a user input for selecting one or more grids from among the plurality of grids from the input obtaining unit 2b-150. Here, the user input may be obtained through at least one of a touch operation, a tap operation, a drag operation, and a click operation.

The controller 2b-120 according to the present disclosure may control the PTZ camera 2a-30 according to a third setting value corresponding to a first grid, with respect to the first grid from among the selected one or more grids, and may obtain a focus setting value corresponding to the first grid from the PTZ camera 2a-30.

The controller 2b-120 according to the present disclosure may generate a fourth setting value corresponding to the first grid, based on the focus setting value, and may control the PTZ camera 2a-30 according to the fourth setting value corresponding to the first grid.

The controller 2b-120 according to the present disclosure may divide a second image into a plurality of grids based on the zoom performance of the PTZ camera 2a-30 and a zoom ratio of the second image.

Figure 2C:
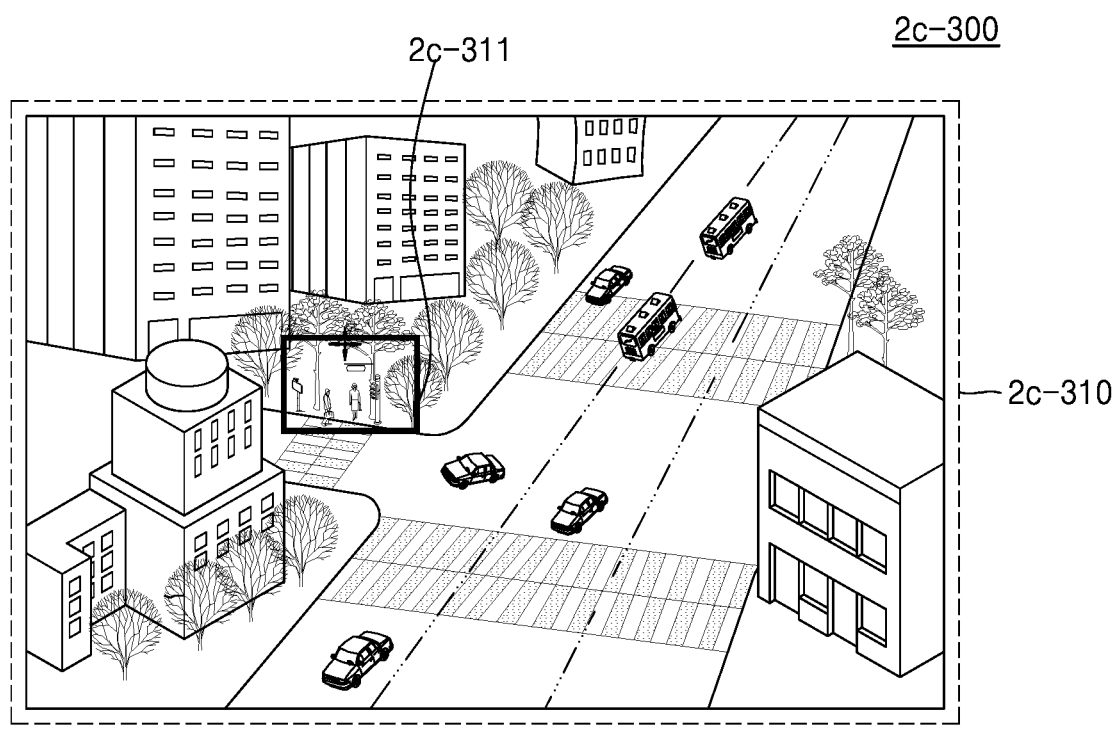
FIG. 2C illustrates an example of a screen of a user terminal, on which a first image is displayed.

FIG. 2C illustrates an example of a screen 2c-300 of the user terminal 2a-100, on which a first image is displayed.

Referring to FIG. 2C, the screen 2c-300 may include an image display area 2c-310. The image display area 2c-310 may display an image obtained by the PTZ camera 2a-30, such as the first image. The first image may be the image in a maximum zoom-out state of the PTZ camera 2a-30.

The user terminal 2a-100 according to the present disclosure may display the first image on the image display area 2c-310.

The user terminal 2a-100 may obtain a user input for setting an area 2c-311 in the first image displayed on the screen 2c-300. The area 2c-311 may correspond to a second PTZ setting value. The PTZ camera 2a-30 may obtain an image of an angle of view corresponding to a corresponding area, in the corresponding PTZ setting value.

For example, the user terminal 2a-100 according to the present disclosure may obtain a user input for setting an area in the form of a quadrangle having a certain ratio between a horizontal length and a vertical length in the first image displayed on the screen and may control the PTZ camera 2a-30 to have an angle of view of the corresponding area to obtain the second image.

The user terminal 2a-100 according to the present disclosure may transmit a control command for controlling the PTZ camera 2a-30 according to the second PTZ setting value to the PTZ camera 2a-30. The PTZ camera 2a-30 may capture the second image according to the second setting value. The setting value may include not only a pan value, a tilt value, and a zoom value, but also a focus setting value.

The PTZ camera 2a-30 may be controlled to have the angle of view of the corresponding area through the pan value, the tilt value, and the zoom value and obtain an image, in the process of capturing the image according to the setting value. When the setting value of the PTZ camera 2a-30 includes the focus setting value, the PTZ camera 2a-30 may set the focus with reference to the focus setting value. Also, when the setting value of the PTZ camera 2a-30 does not include the focus setting value, the focus may be automatically set, and the focus setting value may be stored or transmitted to the user terminal 2a-100.

Figure 2D:
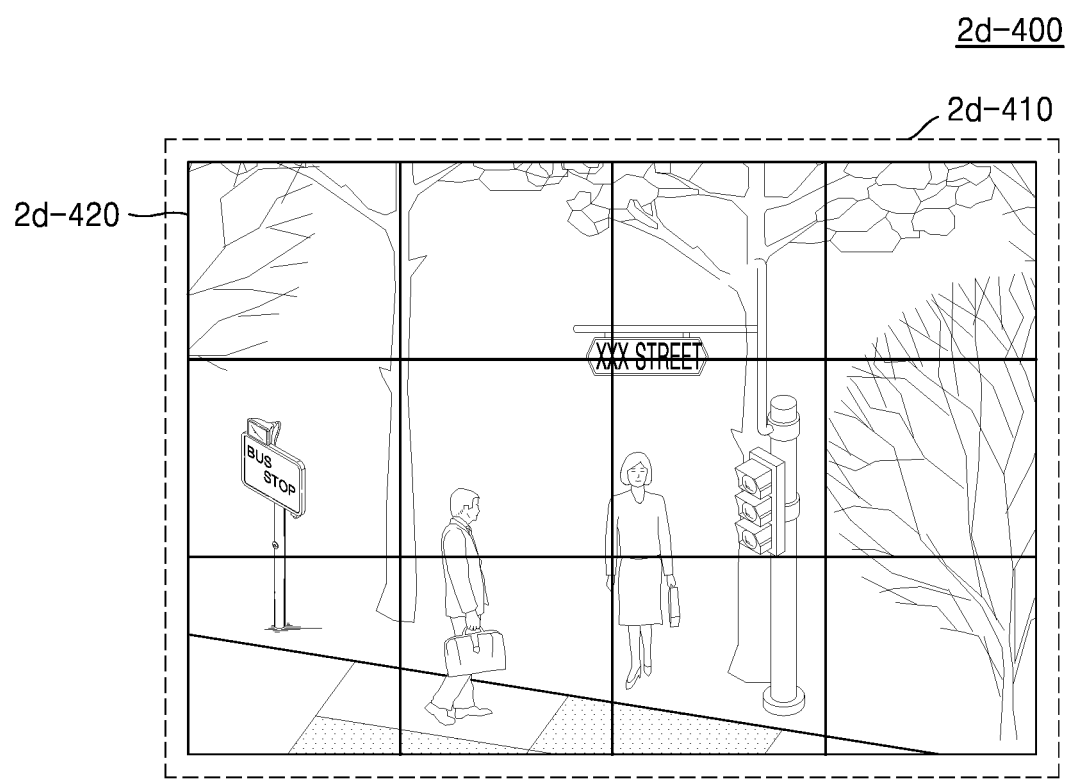
FIG. 2D illustrates an example of a screen of a user terminal, on which a second image and a plurality of grids are displayed.

FIG. 2D illustrates an example of a screen 2d-400 of the user terminal 100, on which the second image and a plurality of grids 2d-420 are displayed. As described above, the PTZ camera 2a-30 may capture the second image according to the second setting value.

Referring to FIG. 2D, the screen 2d-400 may include an image display area 2d-410. The image display area 2d-410 may display the image captured by the PTZ camera 2a-30, such as the second image, and the plurality of grids 2d-420. The second image may correspond to the second setting value.

The user terminal 2a-100 according to the present disclosure may obtain the second image captured by the PTZ camera 2a-30 and may divide the second image into a plurality of grids based on the performance of the PTZ camera 2a-30. In detail, the user terminal 2a-100 may divide the second image into the plurality of grids according to various methods, based on the zoom performance of the PTZ camera 2a-30 and a zoom ratio of the second image. An area indicated by a grid, according to the present disclosure, may correspond to a maximum angle of view which may be obtained by zooming of the PTZ camera 2a-30. When a maximum zoom performance rate of the PTZ camera 2a-30 is 120 times, and a zoom ratio of the second image is 10 times, the second image may be divided into 12 grids.

The user terminal 2a-100 may obtain a user input for selecting one or more grids from among the plurality of grids 2d-420. For example, the user terminal 100 may obtain the user input for selecting the one or more grids from among the plurality of grids 2d-420 through at least one of a touch operation, a tap operation, a drag operation, and a click operation.

Figure 2E:
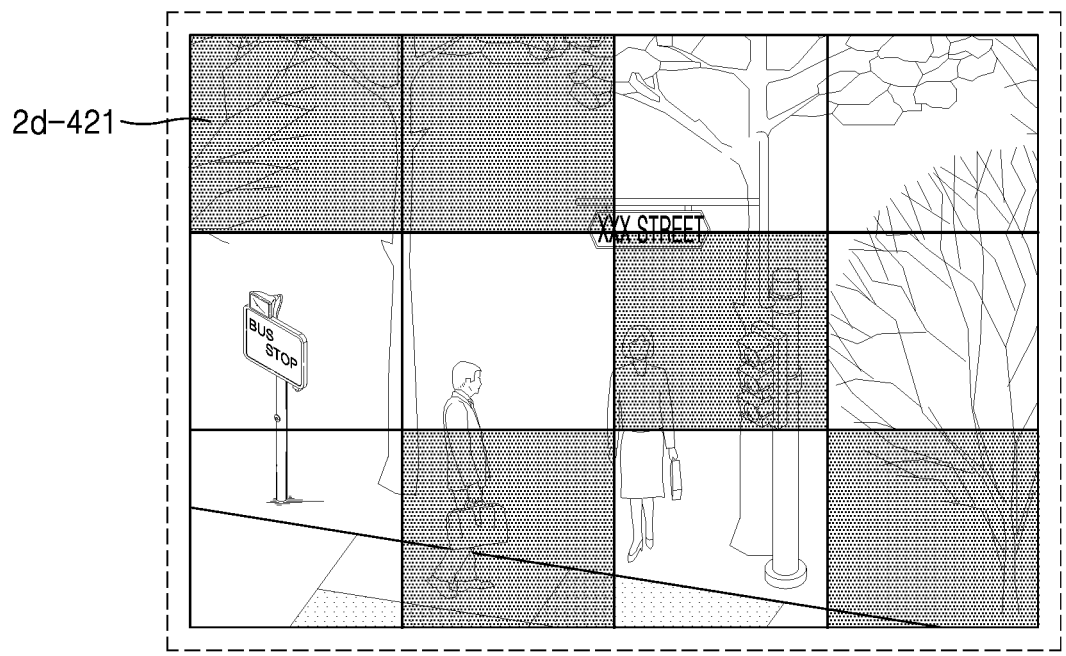
FIG. 2E illustrates an example of a screen of a user terminal, on which selected at least one grid is displayed.

FIG. 2E illustrates an example of a screen of the user terminal 2a-100, on which selected one or more grids 2d-421 are displayed.

Referring to FIG. 2E, the user terminal 2a-100 may obtain a user input for selecting one or more grids from among the plurality of grids 2d-420 and may display the selected one or more grids 2d-421. Here, the selected one or more grids 2d-421 may be distinguished from the plurality of grids 2d-420 with respect to a shade, a color, hatching, etc.

The user terminal 2a-100 may control the PTZ camera 2a-30 according to a third setting value corresponding to a first grid, with respect to the first grid from among the selected one or more grids 2d-421.

The user terminal 2a-100 may control the PTZ camera 2a-30 to have an angle of view of an area corresponding to the first grid. The user terminal 2a-100 according to the present disclosure may transmit a control command for controlling the PTZ camera 2a-30 according to the third PTZ setting value to the PTZ camera 2a-30. The setting value may include not only a pan value, a tilt value, and a zoom value, but also a focus setting value.

The PTZ camera 2a-30 may be controlled to have the angle of view of the corresponding area through the pan value, the tilt value, and the zoom value and obtain an image in the process of capturing the image according to the setting value. When the setting value of the PTZ camera 2a-30 includes the focus setting value, the PTZ camera 2a-30 may set the focus with reference to the focus setting value. Also, when the setting value of the PTZ camera 2a-30 does not include the focus setting value, the focus may be automatically set and the focus setting value may be stored or transmitted to the user terminal 2a-100.

The user terminal 2a-100 may control the PTZ camera 2a-30 to have an angel of view of an area corresponding to the first grid and may receive the focus setting value to generate a fourth setting value corresponding to the first grid. For example, the fourth setting value may include a pan value, a tilt value, a zoom value, and the focus setting value of the PTZ camera 2a-30 for the PTZ camera 2a-30 to have the angle of view of the area corresponding to the first grid. The user terminal 2a-100 may store the fourth setting value.

Thereafter, the user terminal 12a-00 may control the PTZ camera 2a-30 according to the fourth setting value, when the user terminal 2a-100 controls the PTZ camera 2a-30 to have an angle of view of an area corresponding to the first grid. The PTZ camera 2a-30 may set a focus based on the focus setting value included in the fourth setting value.

Through the series of processes as described above, the PTZ camera 2a-30 may relatively rapidly set the focus, when the PTZ camera 2a-30 is controlled to have an angle of view of selected at least one grid area.

FIG. 2F is a flowchart of an operation of the user terminal 2a-100 according to the present disclosure.

Referring to FIG. 2F, the user terminal 2a-100 may display, on a screen, a first image obtained from the PTZ camera 2a-30 according to the first setting value, in operation S610. The first image may be an image in a maximum zoom-out state of the PTZ camera 2a-30. The setting value may include not only a pan value, a tilt value, and a zoom setting value, but also a focus setting value.

The user terminal 2a-100 according to the present disclosure may obtain a user input for setting, on the screen, an area corresponding to a second setting value in operation S620. The user terminal 2a-100 may obtain a user input for setting an area in the form of a quadrangle having a certain ratio between a horizontal length and a vertical length in the first image displayed on the screen.

The user terminal 2a-100 according to the present disclosure may transmit a control command for controlling the PTZ camera 2a-30 according to the second setting value to the PTZ camera 2a-30 in operation S630, and the PTZ camera 2a-30 may capture a second image according to the second setting value and transmit the second image to the user terminal 2a-100. The user terminal 2a-100 may obtain the second image from the PTZ camera 2a-30 according to the second setting value.

The user terminal 2a-100 according to the present disclosure may divide the second image into a plurality of grids based on the performance of the PTZ camera 2a-30 in operation S640. In detail, the user terminal 2a-100 may divide the second image into the plurality of grids according to various methods, based on the zoom performance of the PTZ camera 2a-30 and a zoom ratio of the second image. An area indicated by a grid according to the present disclosure may correspond to a maximum angle of view which may be obtained by zooming of the PTZ camera 2a-30.

The user terminal 2a-100 according to the present disclosure may display the second image and the plurality of grids on the screen in operation S650.

The user terminal 2a-100 according to the present disclosure may obtain a user input for selecting one or more grids from among the plurality of grids on the screen and may display the selected one or more grids, in operation S660. Here, the selected one or more grids may be distinguished from the plurality of grids in terms of a shade, a color, hatching, etc.

The user terminal 2a-100 according to the present disclosure may control the PTZ camera 2a-30 according to a setting value with respect to each of the selected one or more grids, in operation S670. For example, the user terminal 2a-100 may transmit a control command for controlling the PTZ camera 2a-30 according to a third setting value corresponding to a first grid, with respect to the first grid from among the selected one or more grids. The PTZ camera 2a-30 may control the PTZ camera 2a-30 according to the third setting value and may automatically set a focus. The PTZ camera 2a-30 may store the focus setting value or transmit the focus setting value to the user terminal 2a-100.

The user terminal 2a-100 according to the present disclosure may obtain the focus setting value corresponding to the first grid from the PTZ camera 2a-30 and may generate a fourth setting value corresponding to the first grid, in operation S680. For example, the fourth setting value may include a pan value, a tilt value, a zoom value, and the focus setting value of the PTZ camera 2a-30 for the PTZ camera 2a-30 to have an angle of view of an area corresponding to the first grid. The user terminal 2a-100 may store the fourth setting value.

Thereafter, the user terminal 2a-100 may control the PTZ camera 2a-30 according to the fourth setting value, when the user terminal 2a-100 controls the PTZ camera 2a-30 to have the angle of view of the area corresponding to the first grid. The PTZ camera 2a-30 may set a focus based on the focus setting value included in the fourth setting value.

According to the present disclosure as described above, the user terminal 2a-100 may store the setting value in grid units selected by the user and may use the setting value when the user terminal 2a-100 controls the PTZ camera 2a-30, and thus, may relatively more effectively provide an obtained image during the process of controlling the PTZ camera 2a-30.

The embodiment as described above may be implemented as a computer program executable by various components on a computer, and this computer program may be recorded on a computer-readable medium. Here, the medium may include a magnetic medium, such as a hard disk, a floppy disk, and a magnetic tape, an optical recording medium, such as compact disk (CD)-read-only memory (ROM) and digital versatile disk (DVD), a magneto-optical medium, such as a floptical disk, and a hardware device specially configured to store and execute a program command, such as ROM, random-access memory (RAM), and a flash memory. Furthermore, the medium may include an intangible medium implemented as a type to be transmitted on a network, for example, a type of medium which may be implemented as software or an application and transmitted and distributed through the network.

The computer program may be specially designed and configured for the disclosure or may be well-known to and usable by one of ordinary skill in the field of computer software. Examples of the computer program include advanced language codes that may be executed by a computer by using an interpreter or the like as well as machine language codes made by a compiler.

Particular executions described in the disclosure are examples and do not limit the scope of the disclosure by any means. For the sake of brevity, conventional electronics, control systems, software development and other functional aspects of the systems may not be described. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Also, unless components are specifically mentioned by using terms such as "essential," "important," etc., the components may not be necessarily required for the implementation of the disclosure.

The disclosure is described as above. However, it is possible that various modifications or alterations may be applied to the disclosure without deviating from the gist and the scope of the disclosure. Therefore, as long as these modifications or alterations are included in the gist of the disclosure, these modifications or alterations shall be included in the scope of the accompanying patent claims.

According to the present disclosure, the PTZ camera may be relatively more effectively controlled.

It should be understood that the present disclosure described herein should be considered in a descriptive sense only and not for purposes of limitation. Descriptions of features or aspects within each example should typically be considered as available for other similar features or aspects in other examples. While one or more examples have been described with reference to the figures, it will be understood by one of ordinary skill in the art that various changes in form and details may be made therein without departing from the spirit and scope as defined by the following claims.

What is claimed is:

1. A method of controlling a pan-tilt-zoom (PTZ) camera via a user terminal, the method comprising:
   displaying, on a screen, a first image obtained from the PTZ camera according to a first setting value;
   obtaining, on the screen, a first user input for setting an area corresponding to a second setting value;
   displaying, on the screen, a second image obtained from the PTZ camera according to the second setting value;
   obtaining, on the screen, a second user input; and
   generating a plurality of areas corresponding to the second user input.

2. The method of claim 1, wherein the second user input sets a free curve on the screen.

3. The method of claim 2, wherein the generating the plurality of areas comprises generating the plurality of areas including a plurality of points included in the free curve.

4. The method of claim 1, further comprising:
   controlling the PTZ camera according to each one of a third setting value corresponding to each one of the plurality of areas; and
   obtaining each one of a focus setting value corresponding to each one of the plurality of areas from the PTZ camera.

5. The method of claim 4, further comprising:
generating each one of a fourth setting value corresponding to each one of the plurality of areas based on the focus setting value; and
controlling the PTZ camera according to each one of the fourth setting value corresponding to each one of the plurality of areas.

6. The method of claim 1, wherein the second user input sets a plurality of points on the screen, and
the generating the plurality of areas comprises generating a plurality of areas including the plurality of points.

7. The method of claim 1, wherein the displaying the second image on the screen comprises:
dividing the second image into a plurality of grids based on performance of the PTZ camera; and
displaying the second image and the plurality of grids on the screen.

8. The method of claim 7, further comprising, with respect to a first grid from among selected one or more grids, controlling the PTZ camera according to a third setting value corresponding to the first grid; and
obtaining a focus setting value corresponding to the first grid from the PTZ camera.

9. The method of claim 8, further comprising:
generating a fourth setting value corresponding to the first grid based on the focus setting value; and
controlling the PTZ camera according to the fourth setting value corresponding to the first grid.

10. The method of claim 7, wherein the dividing the second image into the plurality of grids comprises dividing the second image into the plurality of grids based on zoom performance of the PTZ camera and a zoom ratio of the second image.

11. A user terminal configured to control a pan-tilt-zoom (PTZ) camera and comprising a controller, wherein the controller is configured to:
display, on a screen, a first image obtained from the PTZ camera according to a first setting value;
obtain, on the screen, a first user input for setting an area corresponding to a second setting value; display, on the screen, a second image obtained from the PTZ camera according to the second setting value;
obtain, on the screen, a second user input; and
generate a plurality of areas corresponding to the second user input.

12. The user terminal of claim 11, wherein the second user input sets a free curve on the screen.

13. The user terminal of claim 12, wherein the controller is further configured to generate a plurality of areas including, near the center thereof, a plurality of points included in the free curve.

14. The user terminal of claim 11, wherein the controller is further configured to control the PTZ camera according to each one of a third setting value corresponding to each one of the plurality of areas and obtain each one of a focus setting value corresponding to each one of the plurality of areas from the PTZ camera.

15. The user terminal of claim 14, wherein the controller is further configured to generate each one of a fourth setting value corresponding to each one of the plurality of areas based on the focus setting value and control the PTZ camera according to each one of the fourth setting value corresponding to each one of the plurality of areas.

16. The user terminal of claim 11, wherein the second user input sets a plurality of points on the screen, and
the controller is further configured to generate the plurality of areas including the plurality of points.

17. The user terminal of claim 11, wherein the controller is further configured to divide the second image into a plurality of grids based on performance of the PTZ camera and display the second image and the plurality of grids on the screen.

18. The user terminal of claim 17, wherein the controller is further configured to, with respect to a first grid from among selected one or more grids, control the PTZ camera according to a third setting value corresponding to the first grid, and obtain a focus setting value corresponding to the first grid from the PTZ camera.

19. The user terminal of claim 18, wherein the controller is further configured to generate a fourth setting value corresponding to the first grid based on the focus setting value and control the PTZ camera according to the fourth setting value corresponding to the first grid.

20. The user terminal of claim 17, wherein the controller is further configured to divide the second image into the plurality of grids based on zoom performance of the PTZ camera and a zoom ratio of the second image.

* * * * *